Nov. 1, 1932.    R. WELLS    1,886,139
GATE VALVE
Filed Sept. 2, 1930
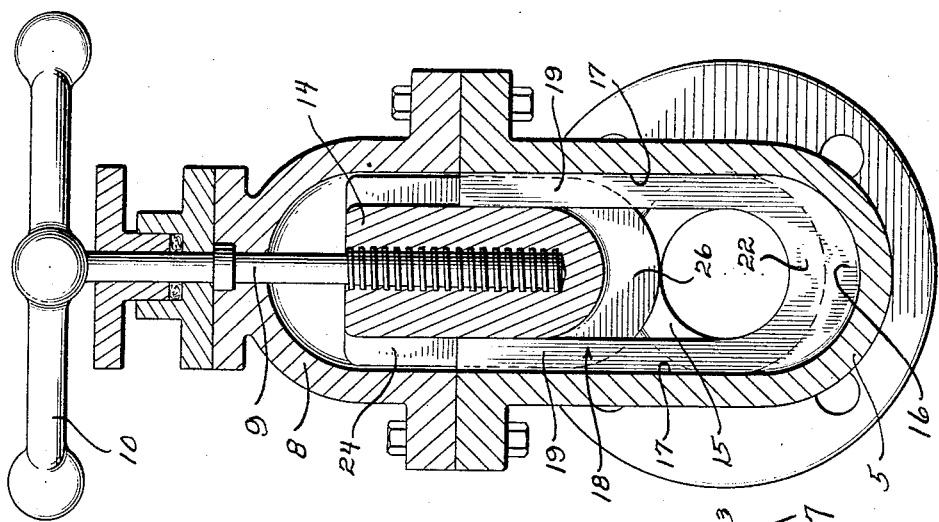
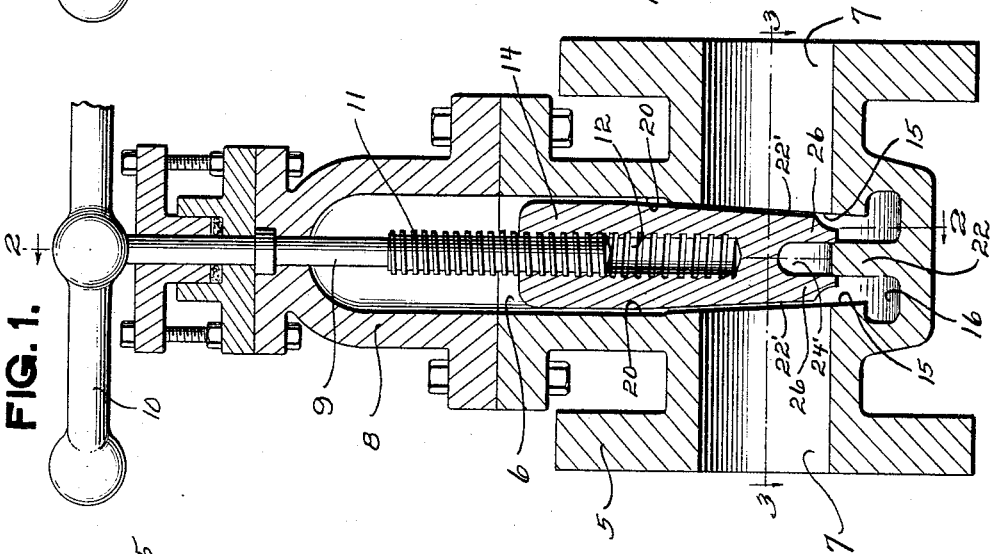
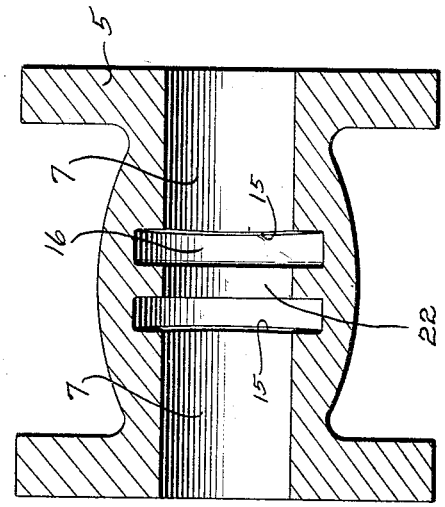
INVENTOR.
Richard Wells
BY
ATTORNEYS.

Patented Nov. 1, 1932

1,886,139

UNITED STATES PATENT OFFICE

RICHARD WELLS, OF BARTLESVILLE, OKLAHOMA, ASSIGNOR, BY MESNE ASSIGNMENTS, TO COLUMBIA PRODUCTS, INCORPORATED, OF BARTLESVILLE, OKLAHOMA, A CORPORATION

GATE VALVE

Application filed September 2, 1930. Serial No. 479,351.

The present invention relates to improvements in gate valves and the primary object of the invention is to provide a gate valve embodying a construction whereby the flow thru the valve will be substantially cut off prior to the point of contacting of the seating faces.

A further object of the invention is to provide a gate valve embodying a construction for cutting off the major portion of the flow prior to seating of the valve elements and thus relieving the seating faces from excessive wear due to wire drawing, etc., at the instant of opening and closing and while the valve is being operated in a pinched position.

A further object of the invention is to provide an improved gate valve wherein the seating surfaces are protected against wear by reason of the specific formation of the valve element and interior of the valve body permitting the valve element to cut off the major portion of the flow thru the valve port prior to movement to a fully seated position.

Other objects and advantages of the invention will be apparent during the course of the following detailed description, taken in connection with the accompanying drawing forming a part of this specification and in which drawing:

Figure 1 is a vertical section thru the improved gate valve showing the valve element in a position to cut off flow thru the valve before its seating faces come to a point of contact with the valve seat.

Figure 2 is a section on line 2—2 of Figure 1 and showing the valve in a fully open position.

Figure 3 is a section on line 3—3 of Figure 1.

In the drawing, and wherein similar reference characters designate corresponding parts thruout the several views, the valve has been shown as being of the wedge gate type embodying a valve body portion 5 provided with a valve chamber 6 and the axially aligning ports 7 which traverse the lower portion of the valve chamber 6. Secured to the upper end of the valve body 5 is a bonnet or dome 8 in which is rotatably mounted the non-rising stem 9 rotated by a suitable handle 10. The lower or inner end of the stem 9 is threaded as at 11 for threaded engagement in a socket 12 of a movable gate or valve element 14.

Provided in the lower portion of the chamber 6 at the inner end of each port 7 is an annular seat 15 and these seats are arranged in inclined relation to one another and in upwardly diverging relation.

The lower end of the chamber 6 extends below the seats 15 forming a wall 16 preferably having a rounded bottom merging into the parallel side walls 17 of the chamber.

Provided interiorly of the valve body 5, within the chamber 6 is a U-shaped rib 18 providing a pair of guide rails 19 arranged midway between the chamber end walls 20 and joined at their lower ends by the web portion 22 arranged in the well 16 and preferably having its upper edge conforming to and aligning with the lower portions of the ports 7. This rib 18 is preferably cast integral with the valve body and has the guide rails 19 extending to the upper end of the chamber 6. The rails 19 and web 20 are of even thickness thruout and it will be observed in Figure 1 that a space is provided between each face of the web and the seats 15.

Referring now to the gate or valve element 14 for controlling the flow thru the ports 7 the same acts in the manner of a wedge gate and is formed with a tapered lower end portion providing flat, tapering faces 22' for engagement with the seats 15. This gate 14 is slidably guided in the valve chamber 6 and is provided midway between the seating faces 22' with a U-shaped groove which extends along both side edges and across the bottom of the gate. The side portions of the groove provide guide channels 24 which receive the guide rails 19 for vertically guiding the gate in the chamber 6 and the lower end of the gate 14 is preferably rounded providing an arcuate groove portion 24' across the bottom of the gate in which the web 22 is received when the gate is lowered to a position across the ports 7.

The lower arcuate channel or groove 24' provides a pair of arcuate-shaped lips or extensions 26 which have sliding movement over opposite sides of the web 22 for cutting off practically all of the flow thru the ports 7 before the seating faces 22' come to the point of contact with the annular seats 15.

Thus it will be seen that the arcuate lips 26 formed by the arcuate lower groove 24' will be guided over the web 22 when the disc is lowered and cut off the major portion of flow thru the ports 7 prior to seating of the faces 22' upon the seats 15 and thus relieve the seating faces from excessive wear due to wire drawing.

Changes in detail may be made to the form of invention herein shown and described, without departing from the spirit of the invention or the scope of the following claims.

I claim:

1. A valve comprising a body portion having a chamber and spaced apart valve seats adjacent one end of the chamber, a web extending between a portion of the confronting faces of the valve seats in spaced relation thereto, and a valve member movable in the chamber and having a portion co-acting with said web for substantially cutting off all of the flow thru the valve prior to the point of seating contact of the valve member on said seats.

2. In a gate valve, a valve body having a chamber, valve seats, and a well below the valve seat, a web in the well between a portion of the seating faces of the valve seats, a valve member movable in the chamber, and lips provided on the valve member and slidably engaging said web for cutting off the major flow thru the valve prior to seating contact of the valve member with the valve seats.

3. In a gate valve, a valve body having a chamber, ports traversing the lower portion of the chamber and providing a well below the ports, a valve seat at the inner end of each port, a web in the well between the lower portions of the valve seats, and a valve member slidably guided in the chamber and having a transverse groove across its lower portion receiving said web for substantially cutting off all of the flow thru the ports prior to the point of contact of the valve member with said seats.

4. In a gate valve, a valve body having a chamber, ports traversing the lower portion of the chamber and providing a well below the ports, a tapered seat at the inner end of each port, a web in said well between the lower portions of the seats, and a valve member slidably guided in the chamber having tapered seating faces for engagement upon said seats and a transverse groove across its lower portion providing spaced apart lips embracing said web prior to the point of contact of the valve member seating faces upon said seats.

5. In a gate valve, a valve body having a chamber, a seat in each end wall of the chamber, a well below said seats, a guide rail in each side wall of the chamber, a web in said well and connecting the lower ends of the guide rails, and a valve member slidably guided on said rails and having a groove across its lower end defining spaced lips for embracing said web prior to the point of seating engagement of the valve member upon said seats.

6. A gate valve comprising a valve body provided with a chamber, confronting valve seats in the chamber, a well below the seats, guide rails along each side wall of the chamber, a web in said well and connecting the lower ends of the guide rails, a valve member having a groove extended along each side edge and across its lower side defining guide grooves for receiving the guide rails and spaced apart lips at the lower end of the valve member engageable with said web for cutting off flow to the valve prior to seating engagement of the valve member with said seats, and means for imparting movement to the valve member.

7. In a gate valve, a valve body having a chamber and confronting seats in the chamber, a U-shaped rib formed in the chamber and having its lower end arranged between the seats, and a valve member provided with a U-shaped groove extending about its sides and across its lower portion for slidably mounting the valve member upon said rib, said valve member at its lower portion co-acting with the lower portion of the rib for cutting off nearly all of the flow thru the valve prior to contact of the valve member with said seats.

RICHARD WELLS.